United States Patent

[11] 3,582,752

| [72] | Inventor | Walter A. Steinberg |
| | | Huntington Station, N.Y. |
| [21] | Appl. No. | 849,124 |
| [22] | Filed | Aug. 11, 1969 |
| [45] | Patented | June 1, 1971 |
| [73] | Assignee | Autonumerics, Inc. |
| | | Westbury, N.Y. |

[54] JOG CONTROL SYSTEM
10 Claims, 2 Drawing Figs.

[52] U.S. Cl.................................................. 318/696,
318/138, 318/443
[51] Int. Cl................................................ G05b 19/40
[50] Field of Search............................................ 318/443,
138, 20.860, 20.85, 20.286, 20.910; 200/6 A

[56] References Cited
UNITED STATES PATENTS

| 2,659,853 | 11/1953 | Morrison...................... | 318/443X |
| 2,679,678 | 6/1954 | Stephan....................... | 200/6X(A) |
| 3,117,268 | 1/1964 | Madsen....................... | 318/443X |
| 3,385,942 | 5/1968 | McCann....................... | 200/6X(A) |
| 3,441,821 | 4/1969 | Tomota et al................ | 318/138 |

Primary Examiner—Benjamin Dobeck
Attorney—Robert J. Frank

ABSTRACT: A motor control system for synchronous stepping motors which permits accurate control of a motor at slow speeds together with rapid slewing for large motor displacements. The system includes a frequency control circuit comprising a field effect transistor for varying the rate at which a timing capacitor in a pulse generator is charged in response to an input displacement signal.

JOG CONTROL SYSTEM

BACKGROUND OF THE INVENTION

This invention relates to a system for accurately controlling the displacement of a machine tool member driven by a synchronous stepping motor and, in particular, to a system for controlling the acceleration and deceleration of the driving motor.

In my copending U.S. Pat. application Ser. No. 808,526 filed Mar. 19, 1969, I describe a positional control system for machine tools which automatically compensates for backlash in the feed screw coupling the synchronous stepping motor to the machine member. In stepping motors of this type, the magnitude of the angular rotation of the rotor is proportional to the total number of pulses applied to the motor stator, and the speed of the rotor is proportional to the rate at which the pulses are applied. These motors are capable of accurate starting and stopping at low speeds and, when it is desired to effect large displacements of the machine member, may be operated at relatively high speeds by increasing the repetition frequency of the pulses applied to the motor. Control circuits are known which may be used to accelerate stepping motors by increasing rapidly the pulse repetition frequency as the motor is started and to stop the motor relatively abruptly as the machine member nears its destination. In one such circuit, the pulse repetition frequency varies from 200 to 1,000 pulses per second during a period of 60 to 70 milliseconds.

It has been found, however, that the rapid deceleration characteristic of the prior-art controllers often causes the machine tool to slide through the backlash in the drive mechanism. In addition, the minimum pulse rate obtainable with reasonable size components is too rapid to permit fine manual positioning because of limitations in the reaction time of the operator. Accordingly, I have invented a motor control circuit which provides pulses at maximum to minimum frequency ratios up to 1,000 to 1. Further, the greater operating range is obtained without increasing the size of the timing components over that required in prior-art circuits having a substantially lower frequency range.

The higher speed ratios obtainable with this invention are desirable for controlling commercially available step motors having high slewing-to-starting speed ratios. The invention also permits convenient manual positioning or jogging of a machine member, including the ability to rapidly slew and then slowly approach a desired position, with a single control switch. In one embodiment a single control unit requiring only one hand to operate permits accurate rapid bidirectional manual positioning in two independent axes. This is in contrast with other machine tool control systems in which the operator is required to manipulate several controls including an axis selector, direction switches, and speed selector in addition to the jog control.

SUMMARY OF THE INVENTION

In accordance with the present invention, a control system is provided for a pair of synchronous stepping motors arranged to drive a machine member along first and second axes. The motors may be operated alone or simultaneously depending upon the position of a manual input device, or on signals obtained from an automatic control system operated from a tape reader or other instruction input device.

The control circuit for each of the motors comprises input means which generates a voltage upon receipt of a signal from the input device. This signal is coupled to a first input terminal of a pulse-generating means and to the input of a frequency control means. The frequency control means comprises a first capacitor coupled by first resistive means to the output of the input circuit and to a transistor having first, second and third terminals. The first terminal of the transistor is coupled through second resistive means to a second input terminal of the pulse-generating means, the second terminal of the transistor to the junction of the capacitor and first resistive means and the third terminal of the transistor to a power supply terminal. Output means are provided for coupling the output of the pulse-generating means to the stepping motor.

In one embodiment of the invention, the pulse-generating means comprises a unijunction transistor having a second capacitor coupled between its emitter and one of its bases. The second capacitor is charged by the current from the output of the input means and discharged when the unijunction transistor begins conducting thereby producing an output pulse.

In the frequency control means, the transistor is a field effect device having the first capacitor coupled to its gate. As the first capacitor is charged by the current from the output of the input means, the current through the field effect transistor increases thereby increasing the current flow to the second capacitor in the pulse-generating means and smoothly increasing the pulse repetition frequency at the output of the pulse-generating means.

When the signal is removed from the input means, the voltage at the input of the frequency control means drops to zero and the first capacitor discharges through a low-impedance path to provide a smooth reduction in the pulse repetition frequency.

DESCRIPTION OF THE PREFERRED EMBODIMENTS

Figure 1:
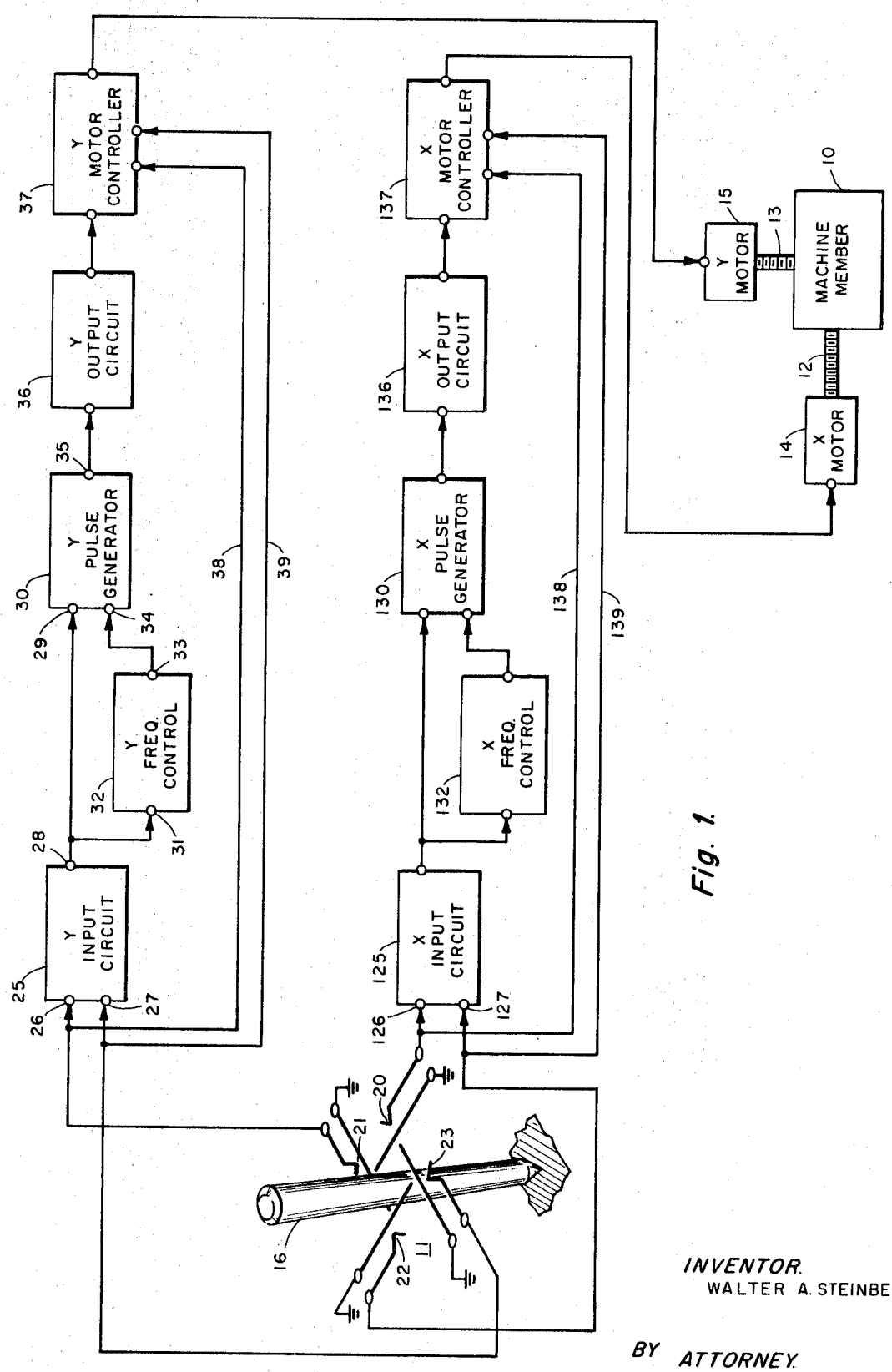
FIG. 1 is a block diagram showing the system for control of the X and Y axes stepping motors by a single manual input device.

Referring to FIG. 1, there is shown a system for controlling a machine member 10 by means of manual controller 11. Machine member 10 is positioned by feed screws 12 and 13 driven by X and Y stepping motors 14 and 15 respectively. Member 10 may, for example, be the table of a milling machine and screws 12 and 13 the longitudinal and crossfeed drives of the table.

The manual controller 11 comprises a control rod 16 which in its neutral state is spring returned to an "off" position normal to the control panel. Displacement of rod 16 to one of the four cardinal points 0°, 90°, 180° or 270° closes normally open switch 20, 21, 22 or 23 respectively and displacement of rod 16 to an intermediate 45° position closes the two switches adjacent the selected position.

When one of the switches 20—23 is closed by actuation of rod 16, one of the input terminals of input circuit 25 or input circuit 125 in the Y or X channels respectively is connected to a reference terminal, or ground, through the closed switch. Thus, closing switches 20, 21, 22 or 23 grounds input terminals 126, 26, 127 or 27 respectively. Further, moving rod 16 to a position intermediate switches 20 and 21 will result in both switches closing thereby grounding simultaneously terminals 126 and 26 of the X and Y input circuits.

Considering first the Y channel, grounding one of the input terminals of input circuit 25 results in a voltage appearing at the output terminal 28 of the input circuit and at the input terminal 29 of pulse generator 30. The voltage at the output terminal 28 is also coupled to the input terminal 31 of a frequency control unit 32 having its output terminal 33 coupled to a second input terminal 34 of pulse generator 30. The output terminal 35 of the pulse generator is coupled through an output circuit 36 and motor controller 37 to the stepping motor 15 which drives the machine member 10 in the Y direction by means of feed screw 13. The direction of rotation of motor 15 is determined by whether lead 38 or 39, connecting the controller to input terminals 26 and 27 respectively, is grounded. Similarly, the X motor 14 is energized through pulse generator 130, frequency control 132, output circuit 136 and motor controller 137. The direction of rotation of motor 14 is determined by whether lead 138 or 139 is grounded.

Assuming that it is desired to move the machine member 10 a short distance along the Y axis, the control rod 16 is moved momentarily to close either switch 21 or 23 depending on the desired direction of movement along the selected axis. A low frequency train of pulses is then generated at the output terminal 35 of pulse generator 30 causing motor 15 to begin rotating slowly in the desired direction. By alternately releasing and actuating the control rod 16 for short intervals, machine member 10 may be "inched" to the desired position.

If, however, it is desired to move the machine member through a relatively large displacement, control rod 16 is held in the direction corresponding to the desired displacement. This causes the frequency control 32 to increase the pulse rate of generator 30 at a controlled rate thereby slewing the Y motor 15 at a rate that increases with time to a predetermined maximum. When in the vicinity of the desired position, control rod 16 is released causing the pulse rate to reset to zero. In order to obtain precise positioning, the motor can then be stepped in small increments by alternately offsetting and releasing the control rod.

Figure 2:
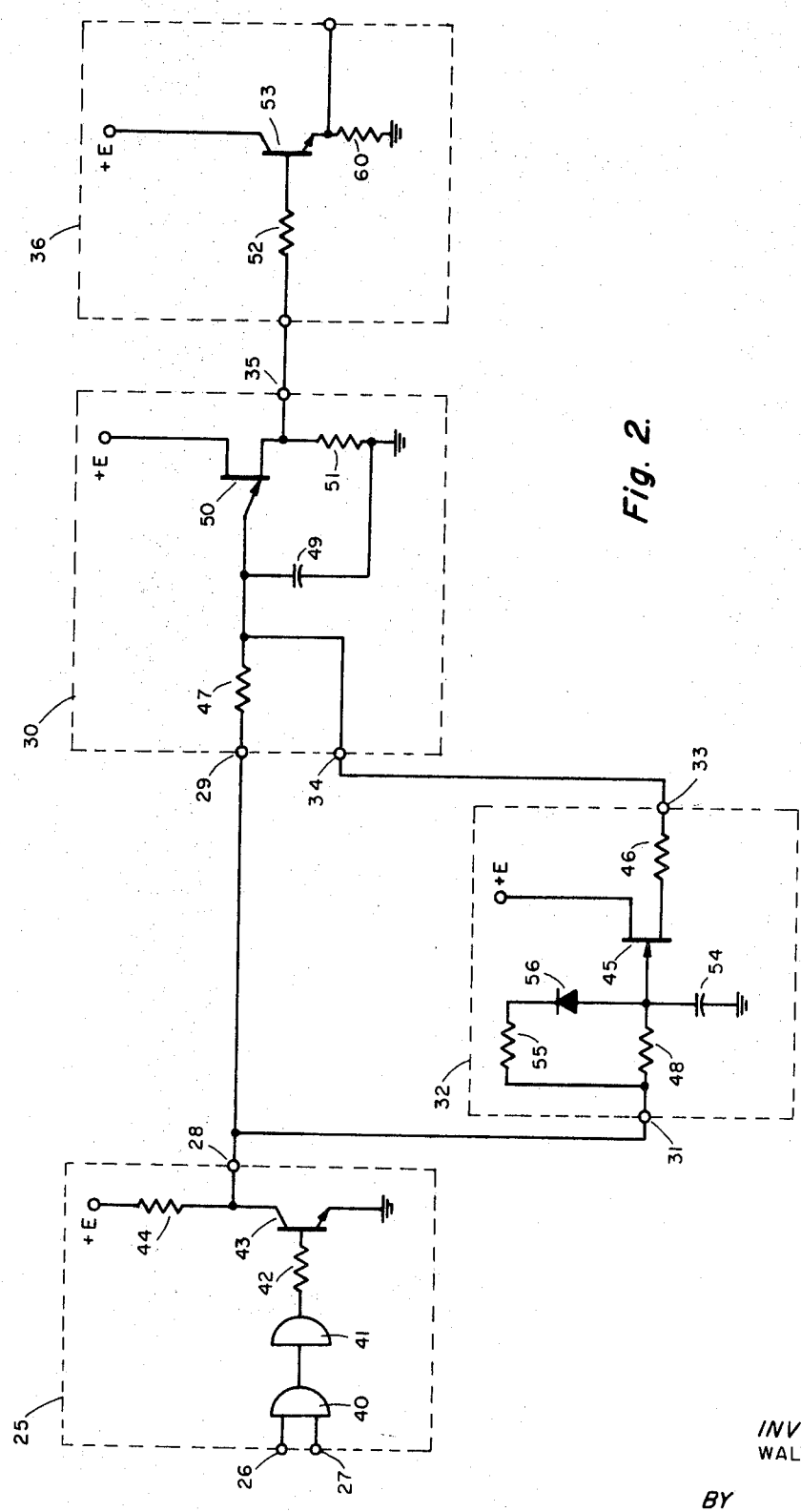
FIG. 2 is a schematic diagram of the input, pulse generator, frequency control and output circuits of the block diagram of FIG. 1.

Details of the input circuit 25, pulse generator 30, frequency control 32 and output circuit 36 are shown in FIG. 2. The input terminals 26 and 27 are connected to a first NAND-NOR gate 40 having its output coupled to an inverting gate 41. Gate 40 has a low output (that is zero or ground) when both inputs are ungrounded. Grounding either input terminals 26 or 27 causes the output of gate 40 to rise from zero to about +5 volts. Five volts applied to gate 41 causes its output to drop to zero and this voltage state is coupled through resistor 42 to the base electrode of transistor 43.

When control rod 16 is in its neutral position, the output of inverting gate 41 is approximately +5 volts and transistor 43 is in its conductive state. The impedance of transistor 43 is low as compared to the resistance of resistor 44 and therefore its collector is essentially at ground potential. The field-effect transistor (FET) 45 in the frequency control 32 conducts a small current through a path consisting of the voltage source +E, resistor 46, resistor 47 and transistor 43. (The current through FET 45 is low because its gate, which is coupled to the collector of transistor 43 through resistor 48 is near zero volts. Under these conditions, the gate junction of the FET is self-reverse-biased and the conducting channel within the transistor is "pinched off" limiting the current flow between its drain and source to a relatively low value.) As a result capacitor 49 which is connected between the emitter and one base of unijunction transistor 50 by resistor 51 is charged to a few volts. This voltage is not however of sufficient magnitude to cause transistor 50 to conduct and the voltage at terminal 35 is held at zero.

If control rod 16 is displaced to its up or down position, contact 21 or 23 is closed grounding one of the inputs to gate 40. As a result, the base of transistor 43 is driven to zero volts cutting off transistor 43 and causing its collector electrode to rise to a voltage of essentially +E. This voltage is applied across capacitor 49 by resistor 47 causing the emitter of unijunction transistor 50 to rise driving it into conduction. Conduction of transistor 50 allows capacitor 49 to discharge through resistor 51, dropping the emitter voltage and cutting off transistor 50. Accordingly, pulses are generated at terminal 35 having a repetition rate determined by the values of resistor 47 and capacitor 49. Resistor 47 and capacitor 49 form a network having a time constant of about 0.05 second producing a pulse repetition rate at the output of pulse generator 30 of approximately 10 pulses per second. These pulses are coupled to motor controller 37 through resistor 52, transistor 53 and resistor 60 in output circuit 36.

The rise in the voltage at the collector of transistor 43 also causes capacitor 54 to be charged through resistor 48 increasing the voltage at the gate of FET 45. The values of resistor 48 and capacitor 54 are chosen such that their product is much greater than the produce of resistor 47 and capacitor 49 (for example 1 second) and therefore capacitor 54 is charged at a lower rate than capacitor 49. As capacitor 54 charges slowly, the current through FET 45 increases substantially linearly thereby increasing the charging current into capacitor 49 above that supplied through resistor 47. Accordingly, if control rod 16 is displaced for a short time, say less than 1 second, and then released, the repetition frequency of the pulses at the output of pulse generator 30 will increase slightly but will remain low enough to permit accurate positioning of machine member 10 by small incremental displacements.

Holding control rod 16 in the displaced position for as long as 2 seconds permits capacitor 54 to charge through resistor 48 to substantially +E volts. FET 45 is thereby driven into a heavily conducting state and the rate of current flow into capacitor 49 is increased substantially. Consequently, the frequency of the pulses at the output of pulse generator 35 increases to its maximum rate and the Y motor slews the machine member 10 rapidly toward the desired position.

Release of control rod 16 to its neutral position results in a positive voltage being applied to transistor 43 causing it to switch to its conducting state. When transistor 43 conducts, its collector drops to approximately ground potential and capacitor 54 discharges rapidly through resistor 55 and diode 56. Reduction in speed of the drive motor from the full slewing rate to zero is accomplished rapidly.

In a typical circuit, the following parameters provided minimum and maximum pulse rates of 10 and 1,500 pulses per second respectively, a buildup to maximum rate in 2 seconds and a reset to zero in 0.1 second.

| | | |
|---|---|---:|
| Resistor 42 | kilohms | 47 |
| Transistor 43 | | 2N3904 |
| Resistor 44 | kilohms | 10 |
| Transistor 45 | | MPF 105 |
| Resistor 46 | kilohms | 5 |
| Resistor 47 | megohm | 1 |
| Resistor 48 | do | 1 |
| Capacitor 49 | microfarad | 0.05 |
| Transistor 50 | | 4871 |
| Resistor 51 | ohms | 47 |
| Resistor 52 | do | 470 |
| Transistor 53 | | 40347 |
| Capacitor 54 | microfarad | 1 |
| Resistor 55 | kilohms | 47 |
| Diode 56 | | 1N914 |
| Resistor 60 | ohms | 47 |

What I claim is:

1. Apparatus for generating voltage pulses with respect to a reference terminal for the control of a stepping motor, said apparatus comprising:
   a. input means having input and output terminals, a voltage being generated between said output and reference terminals in response to an applied input signal,
   b. pulse generating means having a first input terminal coupled to the output terminal of said input means, a second input terminal and an output terminal, said pulse-generating means producing voltage pulses between said output and reference terminals when a voltage is generated between the first input terminal of said pulse-generating means and said reference terminal,
   c. frequency control means having an input terminal coupled to the output terminal of said input means and an output terminal coupled to the second input terminal of said pulse-generating means, said frequency control means comprising
      1. a capacitor having one terminal coupled to said reference terminal,
      2. first resistive means coupling the other terminal of said capacitor to the input terminal of said frequency control means, and
      3. a transistor having first, second and third terminals, the first terminal of said transistor being coupled to the output terminal of said frequency control means, the second terminal being coupled to the junction of said capacitor and first resistive means and the third terminal being coupled to a power supply terminal, said frequency control means controlling the repetition frequency of the pulses generated by said pulse-generating means, and
d. output means coupling the output terminal of said pulse-generating means to said stepping motor.

2. The apparatus defined by claim 1 wherein the transistor in said frequency control means is a field effect transistor and the first terminal of said field effect transistor is coupled to the output terminal thereof by second resistive means.

3. The apparatus defined by claim 1 wherein a series-connected third resistive means and a diode are connected in parallel with said first resistive means.

4. The apparatus defined by claim 1 wherein said input means comprises gating means coupled to the input of a transistor, the input of said gating means being coupled to said input terminal and the collector of said transistor being coupled to said output terminal, the voltage of said output terminal increasing when said input terminal is connected to said reference terminal.

5. The apparatus defined by claim 1 wherein said pulse-generating means comprises
a. a unijunction transistor having first and second bases and an emitter,
b. a capacitor coupled between the emitter of said unijunction transistor and one of said bases,
c. fourth resistive means coupled between the junction of said capacitor and transistor emitter and the first input terminal of said pulse-generating means, and
d. means coupling the second input terminal of said pulse-generating means to the junction of said capacitor and transistor emitter.

6. The apparatus defined by claim 1 which further includes manual control means for applying an input signal to the input terminal of said input means.

7. The apparatus defined by claim 6 wherein said manual control means comprises a control rod and a normally open switch contact coupled to said rod, displacement of said control rod closing said switch contact and applying said input signal to the input terminal of said input means.

8. The apparatus defined by claim 1 wherein said input means is provided with first and second input terminals and wherein said apparatus further includes a control rod and first and second normally open switch contacts mechanically coupled to said rod and electrically connected to said first and second input terminals respectively, displacement of said control rod selectively closing either said first or second switch contact thereby applying an input signal to either the first or second input terminal of said input means.

9. Apparatus for generating voltage pulses with respect to a reference terminal for the control of a stepping motor, said apparatus comprising
a. input means having input and output terminals, a voltage being generated between said output and reference terminals in response to an applied input signal,
b. pulse-generating means having a first input terminal coupled to the output terminal of said input means, a second input terminal and an output terminal, said pulse-generating means producing voltage pulses between said output and reference terminals when a voltage is generated between the first input terminal of said pulse-generating means and said reference terminal,
c. frequency control means having an input terminal coupled to the output terminal of said input means and an output terminal coupled to the second input terminal of said pulse-generating means, said frequency control means controlling the repetition frequency of the pulses generated by said pulse-generating means,
d. output means coupling the output terminal of said pulse-generating means to said stepping motor, said output means having first and second terminals,
e. manual control means comprising
1. a control rod having a neutral and at least two displaced positions, and
2. at least first and second switches mechanically coupled to said control rod, said switches being actuated when said control rod is placed in a corresponding displaced position, and
f. means coupling said first and second switches to the first and second terminals of said output means respectively and to the input terminal of said input means, displacement of said control rod to actuate said first or second switch determining the direction of movement of said stepping motor, the speed of said stepping motor increasing at a controlled rate to a predetermined maximum as said control rod is held in its displaced position, return of said control rod to its neutral position reducing rapidly the speed of said stepping motor.

10. The apparatus defined by claim 9 wherein the ratio of the maximum to minimum frequencies of the pulses generated by said pulse-generating means is approximately 1,000 to 1.